US006615623B1

(12) United States Patent
Ormerod

(10) Patent No.: US 6,615,623 B1
(45) Date of Patent: Sep. 9, 2003

(54) VENDING MACHINE LOCK ARRANGEMENTS

(75) Inventor: Peter Ormerod, Haslingden (GB)

(73) Assignee: Vending Management Services, Ltd., Masterton (NZ)

( * ) Notice: Subject to any disclaimer, the term of this patent is extended or adjusted under 35 U.S.C. 154(b) by 0 days.

(21) Appl. No.: 09/408,063

(22) Filed: Sep. 29, 1999

(30) Foreign Application Priority Data

Sep. 30, 1998 (GB) ............................................ 9821081

(51) Int. Cl.[7] ............................................ B60R 25/02

(52) U.S. Cl. ............................ 70/224; 70/208; 70/210; 70/278.7; 70/279.1; 70/283

(58) Field of Search .......................... 70/208, 210, 224, 70/278.7, 279.1, 283

(56) References Cited

U.S. PATENT DOCUMENTS

| | | | | | |
|---|---|---|---|---|---|
| 1,946,384 | A | * | 2/1934 | Baril et al. | 70/280 |
| 2,219,132 | A | * | 10/1940 | Hohmann et al. | 292/45 |
| 3,089,330 | A | * | 5/1963 | Kerr | 70/140 |
| 3,550,412 | A | * | 12/1970 | Pitel et al. | 70/461 |
| 3,834,198 | A | * | 9/1974 | Wiczer | 70/208 |
| 4,167,104 | A | * | 9/1979 | Bond | 70/208 |
| 4,519,228 | A | | 5/1985 | Sornes | |
| 4,736,970 | A | * | 4/1988 | McGourty et al. | 292/359 |
| 4,760,721 | A | * | 8/1988 | Steinbach | 70/208 |
| 5,018,375 | A | * | 5/1991 | Tully | 70/472 |
| 5,473,236 | A | | 12/1995 | Frolov | |
| 5,694,798 | A | * | 12/1997 | Nunez et al. | 70/283 |
| 5,813,257 | A | * | 9/1998 | Claghorn et al. | 70/208 |
| 6,384,711 | B1 | * | 5/2002 | Cregger et al. | 340/5.65 |

FOREIGN PATENT DOCUMENTS

| | | | |
|---|---|---|---|
| GB | 2 188 762 | A | 10/1987 |
| GB | 2 205 893 | A | 12/1988 |
| GB | 2 250 773 | A | 6/1992 |
| GB | 2 285 469 | A | 7/1995 |
| GB | 2 303 170 | A | 2/1997 |
| WO | WO 93/12510 | | 6/1993 |
| WO | WO 96/08798 | | 3/1996 |

* cited by examiner

*Primary Examiner*—Anthony Knight
*Assistant Examiner*—Christopher Boswell
(74) *Attorney, Agent, or Firm*—Withrow & Terranova PLLC

(57) ABSTRACT

A vending machine locking arrangement operates electronically by way of an electric motor. In particular, the arrangement is a retrofit of an existing, mechanical-key operated T-bar, which is used to close and lock the machine's doors, to provide an electronic locking system not reliant on the use of a mechanical key. The arrangement substitutes for the conventional barrel lock at the handle-end of the T-bar a small electric motor (e.g. a camera re-wind motor) which acts upon the resident locking piece in the T-bar by, e.g., a cam arrangement. The inventive arrangement also makes use of an existing hole near the locking piece for making an electrical connection to the motor. An alternative embodiment places the motor outside the T-bar, the motor then having its own locking piece in the form of, e.g., a rocker arm engaging with an opening in the T-bar. Also disclosed is a smart-card system for driving the motor to trigger the unlocking process. The smart-card may also be used to download the contents of a reader mounted on the machine, these contents providing information on various access parameters related to the machine, e.g. the number of accesses over a period, the cards not allowed access, the identity of the machine, etc.

6 Claims, 2 Drawing Sheets

VENDING MACHINE LOCK ARRANGEMENTS

BACKGROUND OF THE INVENTION

The invention relates to lock arrangements in vending machines, and in particular, but not exclusively, a lock arrangement for a vending-machine T-bar closure device.

Vending machines, and especially those machines, usually quite large, which dispense cold drinks, conventionally employ a so-called T-bar for effecting closure of the machine. This device consists of a fairly long rod having a threaded portion at one end and a handle at the other, forming the "T" of the device. The "T" portion is slideably connected to the threaded portion and spring-loaded with respect thereto. This is illustrated in FIGS. 1 and 2, in which a vending machine 10 is shown with its selection buttons 12 and coin changer 14, shown for illustrative purposes only, and in addition the T-bar 16 which passes through the outer door 18 and an inner, so-called "vault", door 20. When it is desired to close the machine, the threaded portion 22 is brought into engagement with a corresponding female member 24 attached to the body 26 of the machine and the handle 27 is turned until both the vault door 20 and the outer door 18 are tightly shut. (It is particularly important to ensure firm seating of the door surfaces in cold-drinks machines in view of the action of the cooling section 28 normally situated below the dispensing columns 30.) Once the doors are tightly closed, the "T" handle portion is pushed into a recess in the front door, whereupon a locking piece in the "T" portion springs up and holds the "T" portion in place until the next unlocking exercise.

Unlocking is conventionally done by means of a key inserted in a barrel lock 32 disposed inside a bore 34 of the T-bar at the handle end (see FIGS. 3 and 4). Slideably disposed inside the bore at right angles to the axis of the T-bar and protruding from the bore in the locked state is a locking piece 36 having an outer profile 38 which is angled to facilitate the pushing of the "T" portion into the machine-body recess, as already described. The locking piece 36 in the locked state is held behind a detent member (not shown) secured to the chassis or body 26 of the machine. The locking piece 36 is urged in its uppermost ("locked") position by a spring 40, so that a force has to be applied in a downward direction to the locking piece in order to move it to its "unlocked" position. This is achieved by turning of the key in the lock 22 which operates a suitable mechanism (e.g. cam or levers, etc, 42) which acts on a shoulder 44 of the locking piece 36, forcing it downwards against the action of the spring.

Once the key is turned and the locking piece is thereby retracted into the bore 34 of the T-bar, the handle 26 is partially ejected by the spring 46, allowing the holder of the key to open the machine doors by unscrewing the T-bar.

A problem with this conventional system is, firstly, that the key which operates the lock is easily mislaid or lost, or even stolen. Consequently a machine may become subject to theft of its contents. A second problem is that vandals can abuse the machine by interfering with the lock mechanism, in particular by inserting foreign objects into the lock opening, thereby jamming it and preventing lawful opening of the machine. Clearly, such loss and abuse leads to undesirable replacement and repair costs for the operator of the machine. (It should be appreciated that not just the key, but the lock itself may have to be replaced in the interest of security).

There is a requirement for a solution to these problems. Ideally, any solution should be in the form of a retrofit to existing machines, and preferably an inexpensive retrofit, since the profit margin on goods sold via vending machines is already quite small.

SUMMARY OF THE INVENTION

According to the invention there is provided a vending machine lock arrangement, comprising a lock mechanism, a T-bar closure device and an electric motor, the lock mechanism being actuable by means of the electric motor and the lock mechanism and motor being functional in association with the closure device.

The motor in a first embodiment may be disposed within an internal bore of the T-bar at a hand-operated end thereof. The T-bar may comprise a locking piece disposed in the bore and slideable along a transverse axis through an opening in a wall of the T-bar, and the arrangement may comprise an actuation means connected to a shaft of the motor for the displacement of the locking piece. The actuation means may comprise a cam member which is engageable during at least part of its travel with the locking piece, advantageously in such a way as to cause the locking piece to be retracted into the bore. In this way use can be made of an existing locking piece and its existing mode of operation.

The motor may derive its power by way of a contact piece likewise slideably disposed in the bore transverse to a longitudinal axis thereof, the contact piece being urged to protrude through an opening in the T-bar wall for contact with a corresponding contact assembly external to the T-bar. Preferably the contact piece is constituted by a contact pin forming one pole of a voltage supply to the motor, the other pole being constituted by a chassis return of the T-bar. Advantageously the chassis return may be made by way of a securing element holding the motor in place inside the T-bar, and in particular by means of a grub screw.

The motor may be a motor commonly used as a film wind-on drive in cameras.

The locking piece may expediently be a locking piece as conventionally provided in T-bars and the opening through which the contact piece is urged may be an opening conventionally present in T-bars in the vicinity of the locking-piece opening.

The motor, cam and contact piece may be disposed inside a tubular insert dimensioned such as to form a push-fit inside the bore.

In an alternative embodiment of the lock arrangement, the motor may be mounted externally to the T-bar and may be adapted to bring a locking piece into engagement with an opening in the T-bar. A shaft of the motor may be attached to an actuation means for the displacement of the locking piece. The actuation means may comprise a cam member, which can be brought into engagement with the locking piece. The locking piece may be constituted by a rocker arm pivoted by pivot means secured to the vending machine chassis, one end of the arm being engageable with the cam member and the other end having an extension substantially transverse to a longitudinal axis of the T-bar for engagement with the opening in the T-bar.

The motor is preferably caused to operate by means of an electrical signal generated in a card reader mounted in the vending machine, such generation occurring upon validation of a card inserted into the reader.

In a second aspect of the present invention, there is provided a vending-machine T-bar closure device, comprising a locking piece and, inside an internal bore of the device at a handle-end thereof, an electric motor for the actuation of the locking piece.

According to a third aspect of the invention, a vending machine comprises a card reader and a locking means connected to the reader and responsive thereto for performing a locking and/or unlocking operation on the machine, the card reader being arranged to write data to a smart card inserted, in use, into the reader, the data including data relating to access to the machine.

The reader may be arranged to transfer to the smart card at least some of the contents of a memory associated with the reader. The data which are transferred may relate to one or more of the following: the number of machine accesses made during a given period; the identity of the smart cards used to gain those accesses; the number of accesses refused by said reader; the identity of the smart cards to which access was refused; the identity of said machine; the times of day during which access is authorised, and the route on which the machine is situated.

Prior to writing access-related data to the card, the reader will preferably read authorisation-type data from the card in order to determine whether the card has the right to receive the access-related data.

In a fourth aspect of the invention, a data transfer system is provided comprising at least one vending machine as described above and a central administration point, wherein access data relating to the at least one vending machine are transferred to the central administration point by means of the smart card.

BRIEF DESCRIPTION OF THE DRAWINGS

Embodiments of the invention will now be described, purely by way of example only and with the aid of the drawings, of which.

DETAILED DESCRIPTION OF EMBODIMENTS OF THE INVENTION

Figure 1:
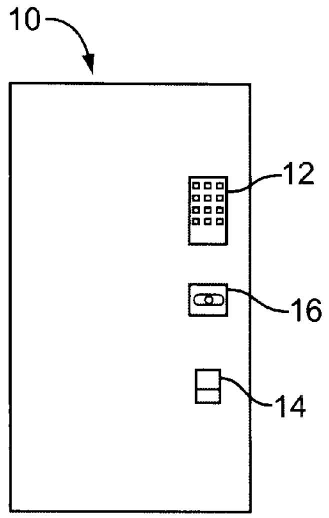
FIG. 1 PRIOR ART
FIG. 1 is a simplified front view of a vending machine.
Figure 2:
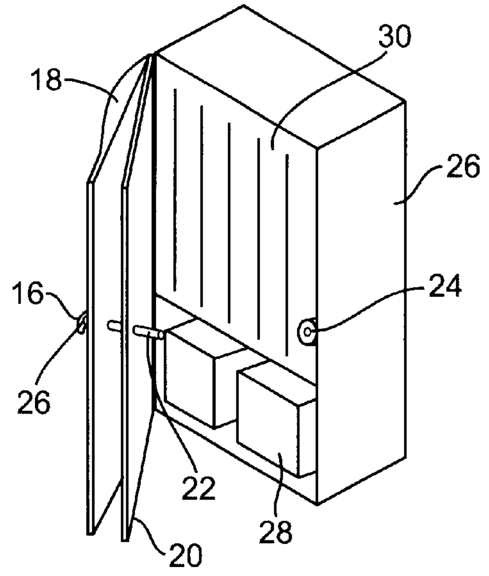
FIG. 2 PRIOR ART
FIG. 2 is a perspective view of a vending machine in its unlocked and partly open state.
Figure 3:
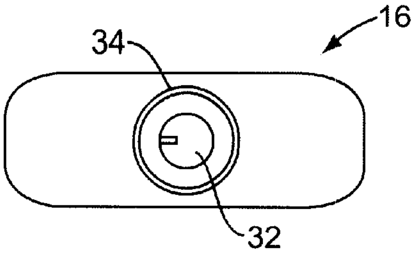
FIG. 3 PRIOR ART
FIG. 3 is a front view of a T-bar conventionally provided for the closing and locking of the machine shown in FIGS. 1 and 2.
Figure 4:
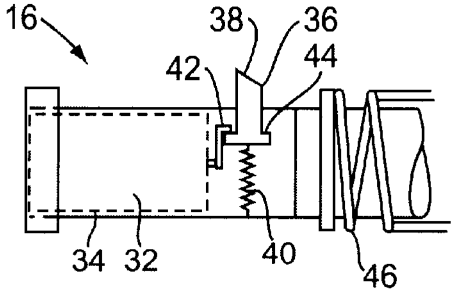
FIG. 4 PRIOR ART
FIG. 4 is a side, partly internal, view of the T-bar shown in FIGS. 2 and 3 and illustrating the conventional use of a barrel lock.
Figure 5:
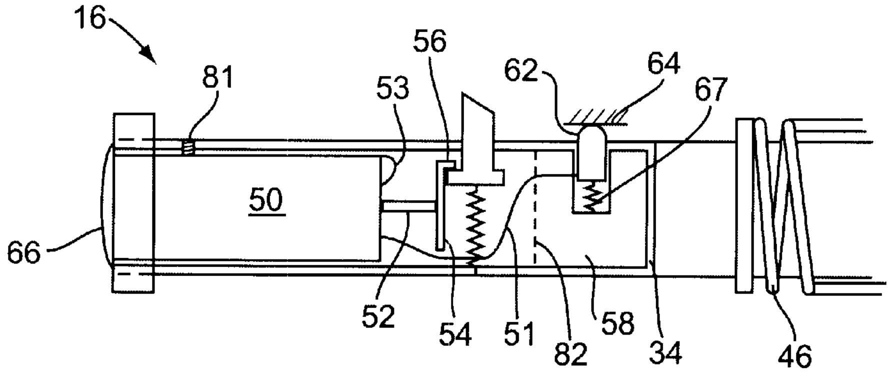
FIG. 5 is the same view as FIG. 4, but illustrating a first embodiment of a lock arrangement in accordance with the present invention in which the barrel lock is replaced by an electric motor.

Referring now to FIG. 5, the invention makes use of the fact that the T-bar has an internal bore 34 normally carrying the lock 32 and takes the inventive step of substituting for that lock 32 a small electric motor 50. The shaft 52 of the motor has mounted thereon an actuating means in the form of a cam disc 54 bearing a cam protrusion 56. The protrusion is arranged to be able to engage with the shoulder 44 of the locking piece 36 during at least part of the rotational path of the protrusion. The motor and cam plate are fitted into the bore 34 via a plastic sheath 58 which is designed to be a push-fit inside the bore and is retained by a grub screw 81 which is normally used to retain the barrel lock 32 in the conventional locking arrangement.

So far what has taken place has been a simple retrofit of the existing T-bar with a motor instead of the usual barrel lock. However, the retrofit goes further by additionally making use of an opening 60 already present in the conventional T-bar a short distance away from the locking piece opening, to accommodate a contact pin 62. This pin 62, which is likewise spring-loaded, is held in the plastic sheath 58 which has been moulded to contain it, and is connected at one end to one feed wire 51 of the motor 50 while the other end is arranged to protrude through the opening 60 in order to make contact with a contact assembly 64, which in this case is simply a contact pad connected to a suitable power-supply point anchored to the vending-machine chassis. The pin is thus urged by its own spring against the contact pad 64, and a firm and effective contact is thereby ensured. The other feed wire 53 of the motor is ground-returned through the T-bar by being connected to the grub screw 81 and hence to the machine chassis.

The plastic sheath 58 is hollow at its outer end to accommodate the motor 50, cam member 54 and locking piece 36, but is solid at its inner end so as to act as a firm seating for the contact piece 62 and its associated spring 67. The transition between the hollow and solid sections is shown in FIG. 5 as a dotted line 82. The motor wire 51 is fed through a largely axially orientated hole (not shown) made in the solid section of the sheath 58.

Finally, to prevent vandalisation of the new lock assembly, the outer open end of the T-bar bore is closed up by the fitting of an end-cap 66.

One drawback with this embodiment is the fact that, once the motor has been energised so as to depress the locking piece 36, the very ejection of the "T" handle portion which takes place automatically causes the two parts of the contact arrangement 62, 64 to disengage, thereby cutting the power to the motor. Hence the motor stops, leaving the cam protrusion 42 in the position it was in just prior to withdrawal of the T-bar, with the result that, when the T-bar is subsequently reinserted and screwed home, the locking piece 36 is not in its desired uppermost protruding position to allow the "T" handle portion to be locked in place when finally pushed into its recess.

The invention solves this problem (see FIG. 6) by arranging for the drive circuit which drives the motor to monitor the resistance of the motor armature coil 67 and, when an open-circuit is detected—which occurs, of course, when the T-bar is ejected—the normal motor drive is switched over to a reset drive which is designed to apply (when the motor is once again in circuit) a short pulse of power to the motor, sufficient to move the cam further round a short distance and release the locking piece. In this respect, FIG. 7 should now be consulted, which shows a detail of the cam and locking-pin actuation mechanism at different stages in the locking and unlocking process.

Figure 7:
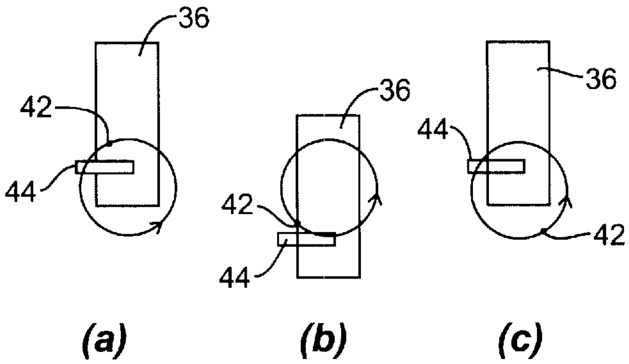

FIG. 7(*a*)—which, in common with FIGS. 7(*b*) and (*c*), is a view along the longitudinal axis of the T-bar, i.e. along the axis of the motor shaft—illustrates the pin 36 in its uppermost, "locked" position. The cam protrusion 42 has not yet engaged with the shoulder 44. When commanded to do so, the motor drives the cam round so that the protrusion 42 makes contact with the shoulder and pushes it down, moving the locking piece into its "unlocked" position, FIG. 7(*b*). Finally, in connection with the reset arrangement described in the last paragraph, when the "T" handle portion is pushed home, the motor drive circuit applies a short pulse to the motor coil which moves the cam round a few more degrees until the protrusion 42 moves into a gap in the shoulder profile, i.e. the shoulder is not annular in shape, but only part-annular. When this occurs, the spring 40 forces the locking piece back up into its fully protruding position shown in FIG. 7(*a*).

A subsequent command to unlock the T-bar simply drives the motor cam round until the protrusion 42 engages once again with the shoulder 44, and the whole cycle repeats itself.

It will be found that, in most machines, the locking piece 36 already has a shoulder 44 which allows the piece to be retracted against spring pressure during part of the cam disc's travel, so that the requirement for a cheap and simple retrofitting of an existing machine is met in this respect also.

Conveniently, it has been found that an ideal motor for this purpose is the kind of motor used to wind on the film in a camera. Indeed, the fit with the wind-on motor used for the prototype was found to be virtually perfect, taking into account the presence of the plastic sheath 58. The only slight problem was that the motor was found to be a little longer than the available distance between the end of the handle part of the T-bar and point at which the locking piece 36 emerges. However, this excess length (of the order of 2 mm) was easily compensated for in a prototype by the fitting of a domed end-cap 66 on the T-bar handle.

Figure 8:
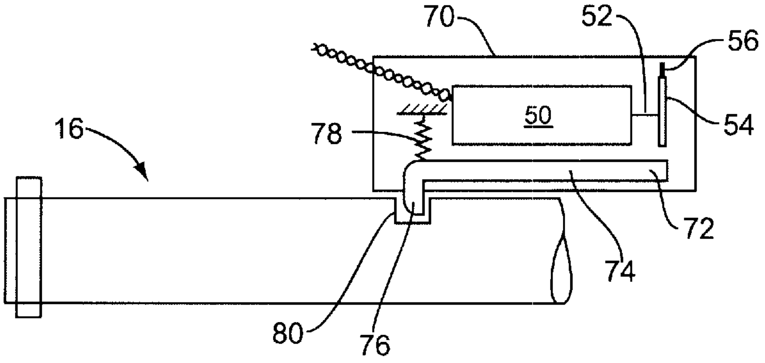
FIG. 8 shows a second embodiment of the lock arrangement according to the invention.

While this embodiment is a neat retrofit of the existing T-bar lock arrangement, it nevertheless has one major drawback, which is the need for a secure ground return through the bar itself to the vending-machine chassis. In a second embodiment this potential drawback is overcome by fitting the motor outside the T-bar. This is illustrated in FIG. 8. In FIG. 8 the motor 50 is housed inside a small sub-housing 70 attached to the vending-machine chassis. The shaft 52 of the motor is, as in the first embodiment, equipped with a cam disc 54, the cam protrusion 56 of which engages one end of a rocker arm 72. The rocker arm 72 is pivoted at an intermediate point 74 along its length and the other end of the arm 72 carries a bent portion 76 directed approximately transversely to the longitudinal axis of the T-bar. Finally, both the supply wires of the motor exit the housing 70 for connection to a motor drive circuit.

In operation of the second embodiment, the arm 72 is biassed in the position shown by a compression spring 78, so that the T-bar is held locked in place by the end-portion 76. When a command to unlock is given, power is fed to the motor 50 which then turns the cam disc 54 until the protrusion 56 engages with the other end of the rocker arm 72, forcing it down against the action of the spring 78. This causes the bent portion 76 to rise until it is lifted free of the opening 80 made in the T-bar. At this point the bar is unlocked and the handle portion is automatically ejected from its recess, as described earlier. When, in a subsequent locking procedure, the handle portion is pushed home into its recess once again, the bent portion 76 of the rocker arm simply slides over the cylindrical surface of the T-bar until it reaches the opening 80, upon which it will drop down into the opening under the action of the spring 78. The machine is now in its locked state once again.

Figure 6:
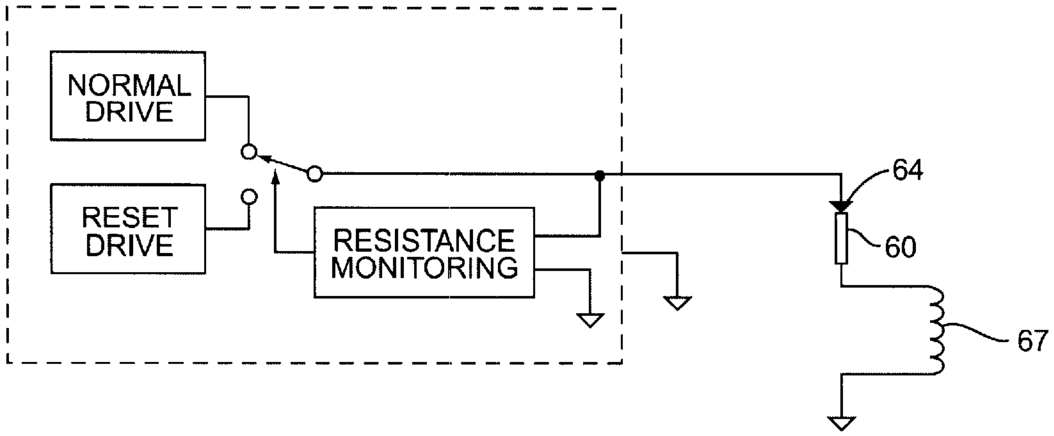
FIGS. 6 and 7 show, respectively, a control arrangement and locking-piece reset mechanism associated with the first embodiment of the lock arrangement according to the invention.

A further advantage of this second embodiment is that, unlike the first embodiment, the motor does not lose its power once the T-bar is withdrawn Consequently there is no need for a motor drive circuit such as that shown in FIG. 6.

The second embodiment envisages that the existing locking piece, which was taken advantage of by the first embodiment, will not be used, but will be replaced by an arrangement such as the rocker arm described. While this embodiment has the advantage of a secure and reliable electrical connection to the motor, it suffers the disadvantage of somewhat greater complexity and requires, for example, the making of a dedicated opening (e.g. a slot) 80 in the T-bar wall.

Figure 9:
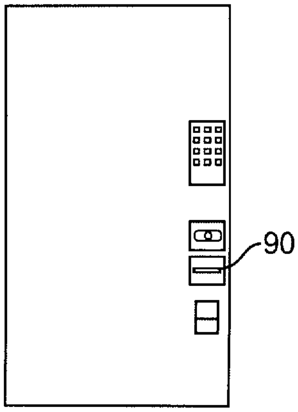
FIG. 9 is a simplified front view of a vending machine showing the incorporation of a card reader for controlling access.

Clearly, since in both embodiments a conventional key is no longer used by service personnel to gain entry into the machine to replenish stock, etc, some alternative means must be provided for instructing the machine to go through its unlocking procedure. To this end the present invention employs a card entry system, in which a card reader 90 is provided in the machine (see FIG. 9) having processing and memory facilities known per se in the art. The processor is connected to a drive output stage (e.g. that of FIG. 6) which is connected to the motor 50 associated with the T-bar.

The reader software is configured so that, when a card is inserted into the reader slot, at least some of the contents of the card are read and stored in memory. Those contents are scanned for signs of authorisation, as determined by comparison of an "authorisation number" field in the card contents with a predetermined such number already lodged in the reader memory. If the two coincide, and if additionally an expiry date programmed into the card's memory has not yet been reached, the motor 50 is energised and the machine is unlocked. The reader may at this stage also record the time of access. If the two numbers do not coincide, or if the expiry date is already past, the reader notes that fact in its memory, along with the actual number input from the card, and refuses access to the holder of the card. The reader may have several such numbers relating to several cards to which it will yield access. Also, it is envisaged that the card will be programmed with a list of vending machines for which it will be valid. That list may be changed every month, or even every day, depending on system requirements.

In a preferred embodiment of this aspect of the invention, the card employed to open the machine is a smart card, i.e. a card having its own intelligence in the form of chips resident on the card. The invention in this case provides for the reader to not only download the card's contents into its memory, but also to upload into the card's memory data including the access log for the machine in question as well as other vending-machine data which the reader accesses via a serial port. The holder of the card can then remove the card and take it to a central administrative section where he can reinsert the card into a reader at that end and have the new contents of the card downloaded into that system's database. The data concerning each vending machine is kept discretely in both the card's memory and the system's database. Any one card may carry, then, data relating to a number of machines.

Examples of data which the card could read from the a vending machine are: the identity of the cards used to gain the last so-many accesses; the number of accesses refused by the reader; the identity of the cards to which access was refused; the identity of the machine in question; the times of day during which access is programmed to be authorised, and the route on which the machine is situated. Other data are, of course, possible. It should be noted that the data concerned are nearly all related to the question of access. Other operational data such as product inventory, alarm conditions, temperature fluctuations, etc, may be communicated to a central point by other means, notably by some kind of modem, either radio or telephone, if fitted. However, in the event that no communications modem is fitted, the smart access card could be used to retrieve the information via the reader's serial port which is connected by suitable interface electronics to the various sensors, etc, present in the machine.

An advantage of the card access system herein proposed is that, were a card to be lost or stolen, it is a simple matter for the card holder to inform the central administration point, who would then take steps to reprogram those readers which were set up to accept the access code number of the lost or stolen card, to refuse access to the card in question where an unauthorised attempt is made to use it.

While the two embodiments of the locking mechanism described earlier have assumed the use of a cam member comprising a cam disc with a cam protrusion, other forms of cam member are equally possible. For example, especially in the case of the second embodiment, the motor shaft may be equipped at the end thereof with a simple arm which, in operation, sweeps through an arc and, at the appropriate point along that arc, operates the rocker arm 72. In both embodiments it may alternatively be possible to employ for the locking-piece actuating means some form of reciprocal motion arrangement with a connecting arm moving the locking pin or the rocker arm, as the case may be, continuously up and down as the shaft rotates. In this case, of course, and considering the first embodiment in particular now, a pivot connection would have to be made with the locking pin, which may require the use of a separately made pin instead of the existing one. This could undesirably increase costs.

Although the first embodiment of the lock arrangement featured a ground return system for the motor drive, an alternative measure would be to substitute for the simple contact pin 62 a two-pole contact piece which engaged with a similarly two-pole contact assembly 64. In this manner the problem of a potential lack of integrity of the return connection is avoided, though at the same time additional complications are incurred in the form of a more elaborate contact arrangement.

Also, whereas in the lock arrangements as so far described the motor has performed an unlocking action on the locking piece, i.e. the locking piece is normally biased into the locking position, it is conceivable to arrange for the motor to perform a locking action instead. In this alternative case the locking piece will be normally biased into its unlocked position. A third possibility is for the motor to effect both locking and unlocking actions, thereby dispensing with the need for a biasing element such as the spring 40, 78.

I claim:

1. A vending machine lock arrangement, comprising:

a) a lock mechanism;

b) a T-bar closure device including an internal bore, a wall having an opening, a locking piece disposed in the bore and slidable along a substantially transverse axis through the opening in the wall of the T-bar device, and a hand-operated end;

c) an electric motor for actuating the lock mechanism and disposed within the bore at the hand-operated end, the motor and the lock mechanism being operatively associated with the T-bar device, the motor having a shaft;

d) actuation means connected to the motor shaft for displacement of the locking piece, including a cam member engageable during at least a part of its travel with the locking piece to cause the locking piece to be retracted into the bore; and e) a contact piece by which the motor derives its power, the contact piece being disposed in the bore and slidable along the transverse axis, the contact piece being urged to protrude through the opening in the wall of the T-bar device for contact with a corresponding contact assembly external to the T-bar device.

2. The lock arrangement as claimed in claim 1, wherein the contact piece is constituted by a contact pin forming one pole of a voltage supply to the motor, the other pole being constituted by a chassis return of the T-bar device.

3. The lock arrangement as claimed in claim 1, wherein the motor, the cam member and the contact piece are disposed inside a tubular insert dimensioned to form a push-fit inside the bore.

4. The lock arrangement as claimed in claim 1, wherein the locking piece is constituted by a rocker arm pivoted by a pivot means secured to a chassis of a vending machine, one end of the arm being engageable with the cam member and the other end having an extension substantially transverse to a longitudinal axis of the T-bar device for engagement with the opening in the T-bar device.

5. The lock arrangement as claimed in claim 1, wherein the motor is caused to operate by means of an electrical signal generated in a card reader mounted in a vending machine.

6. The lock arrangement as claimed in claim 5, wherein the card reader is arranged to generate the electrical signal upon validation of a card inserted into the reader.

* * * * *